April 6, 1937.    I. E. McCABE    2,075,951
ELECTRIC CONTROL
Filed April 18, 1935    5 Sheets-Sheet 1

INVENTOR.
IRA E. McCABE
BY Langton Moon
ATTORNEY.

April 6, 1937.  I. E. McCABE  2,075,951
ELECTRIC CONTROL
Filed April 18, 1935  5 Sheets-Sheet 2

INVENTOR.
IRA E. McCABE
BY
ATTORNEY.

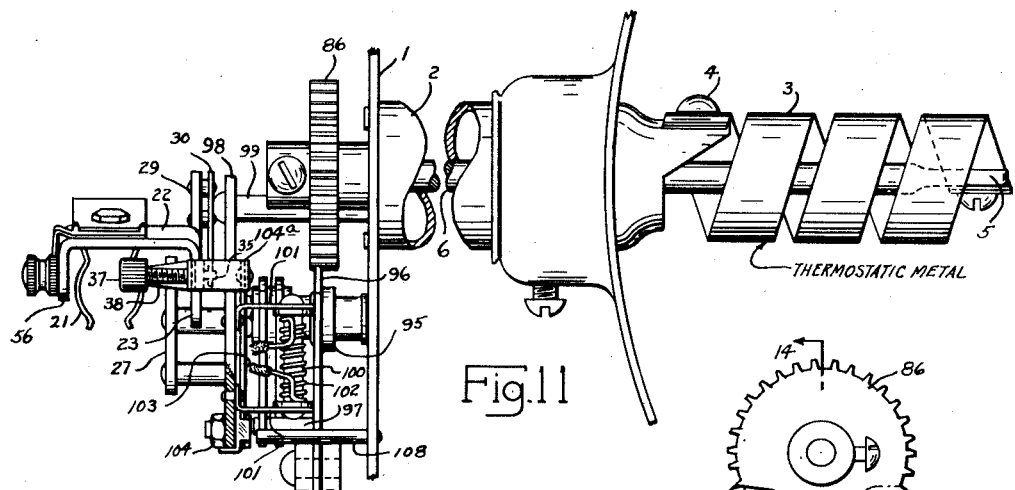

April 6, 1937.   I. E. McCABE   2,075,951
ELECTRIC CONTROL
Filed April 18, 1935   5 Sheets-Sheet 4
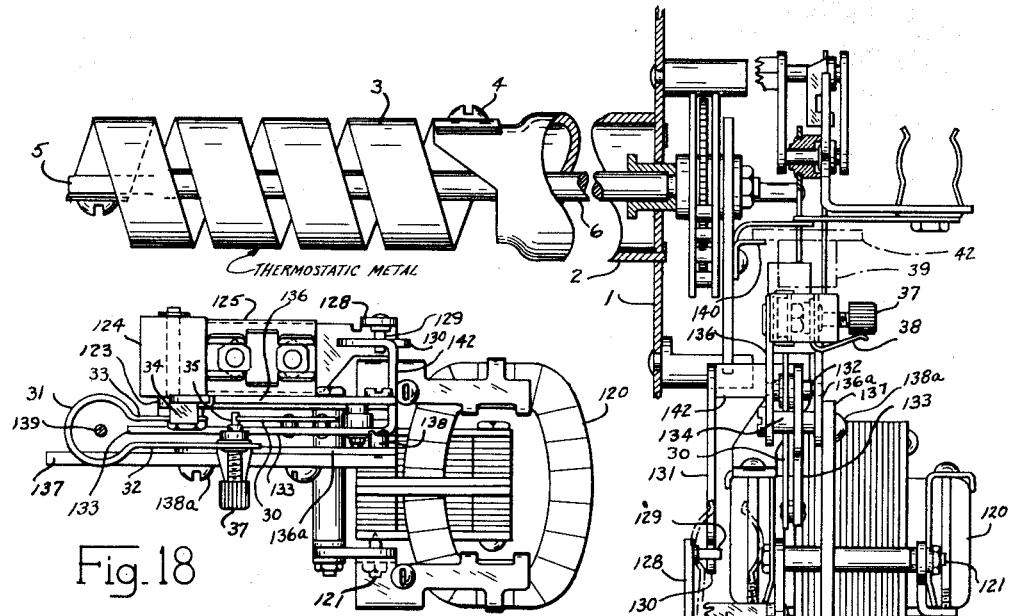
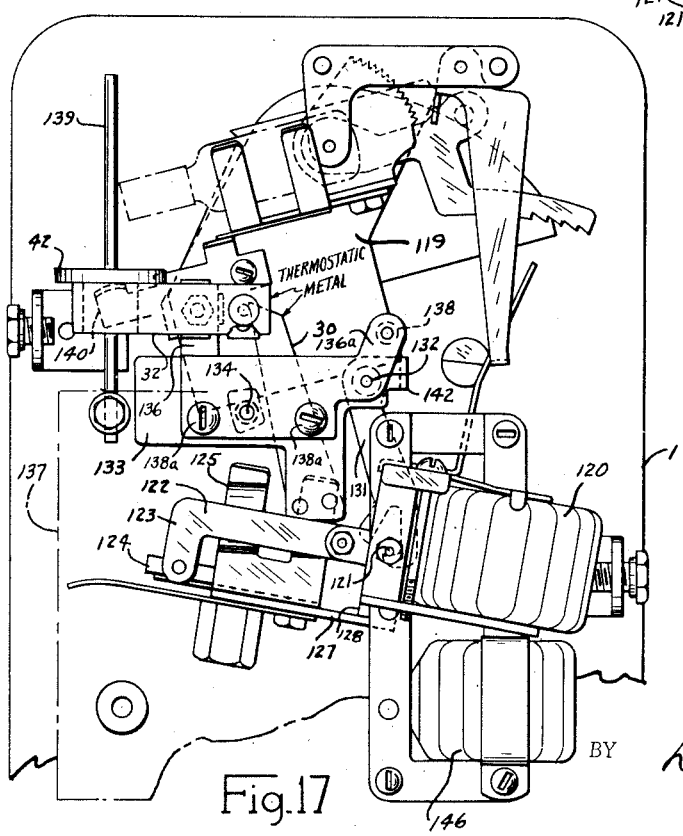
INVENTOR.
IRA E. McCABE
BY
ATTORNEY.

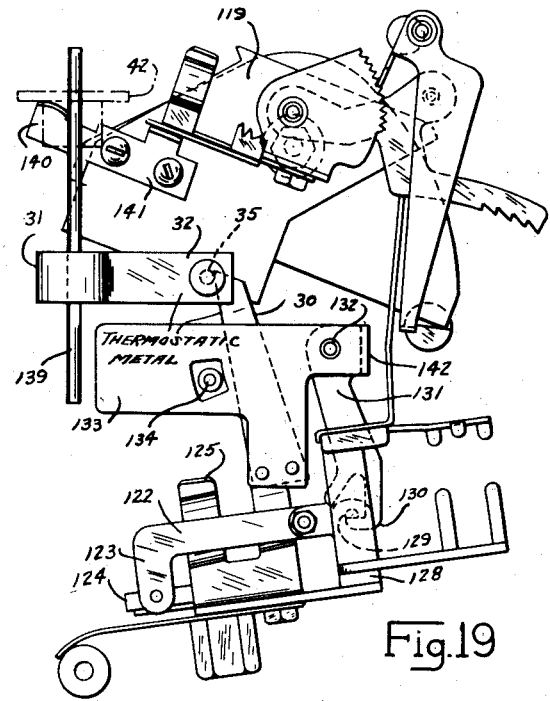

Patented Apr. 6, 1937

2,075,951

UNITED STATES PATENT OFFICE 2,075,951

ELECTRIC CONTROL

Ira E. McCabe, Chicago, Ill.

Application April 18, 1935, Serial No. 17,073

32 Claims. (Cl. 200—139)

This invention relates to improvement in electric controls and to a simplified device for such controls wherein it is desired to open the circuit after a predetermined time in case of failure of certain functions of other devices in the control, or controlled, circuit, and more particularly to that type of device used to stop the equipment upon failure of combustion or ignition in fluid fuel burners.

In a number of previous applications, this applicant has disclosed various methods and means of producing such devices, many of which have attained considerable commercial use. One form disclosed in Patent Nos. 1,686,286 of October 2, 1928 and 1,690,689 of November 6, 1928 comprised a normally open switch with detachable means for holding the switch in closed position releasable by heat, generated by an electric current, including means for varying the current passing through said heat generated means in accordance with temperature or pressure changes.

Another form disclosed in this applicant's Patent No. 1,681,421 of August 21, 1928 involved the use of a similar thermal safety device included in a circuit to a fluid fuel burner wherein the heat generated means for releasing the safety switch was constantly energized during the operation of the burner and means included, operable upon the establishment of combustion, to divert a stream of air from the burner draft tube, produced by the burner fan, to cool the heat generated means.

Still another form, and one which has been successfully applied to the extent of wide commercial use, is disclosed in this applicant's Patent Nos. 1,675,897 of July 3, 1928; 1,648,390 of November 8, 1927, and 1,884,045 of October 25, 1932, and his pending applications, Serial Nos. 19,310, filed March 30, 1925, and 661,759, filed March 20, 1933, incorporated the use of electrically operated thermally actuated safety releases in combination with switching means operating under certain conditions to establish a shunt circuit by which the current may be by-passed around the electrically operated thermal release.

Although the devices wherein the shunting circuit is employed is being commercially adapted in one form or another in electrical controls of the character herein disclosed, they have presented problems when attempts to apply them to certain classes of applications have been made, as well as leaving room for improvements in their more common applications.

When the heat generated means is in series with the load, and the operating requirements of such loads as solenoids or magnetically operated devices is small, after starting, the impressed voltage on the load is increased when the shunt circuit is closed, and the load is thus subjected to additional current. A reverse of this characteristic would be more suitable or desirable as an increase in resistance of the circuit would limit the current instead of it being increase as it is in the shunt circuit applications heretofore referred to. Furthermore, the heat generated means upon being shunted out naturally cools and in the event the shunt circuit is caused to open, as in the case of flame failure during the operation of a fluid fuel burner, the time required to effect the release of the safety switch necessitates the heating of the heat generated means which, however short as it is possible to make that period, may nevertheless be of such duration that should the flame extinguishment have been caused by an air pocket or sludge of water in the fuel supply line, the burner, which continues to operate, would permit fuel to be admitted to a hot combustion chamber without immediate means to ignite it, thus producing a hazardous condition for a longer period of time than with the method herein disclosed.

The advantages of using mercury switches as circuit breakers are well known, but their use in electrical circuit controls, such as disclosed in the aforementioned patents particularly Nos. 1,675,897 and 1,884,045, require considerable mechanism for the development of the power and means to operate them, or specially designed shunting devices, as shown in Patent No. 1,648,390, so that in recent years there has been a trend toward producing controls of the disclosed character employing open contacts, even though they are inferior to mercury switches, being less durable and dependable and subject to pitting, sticking and corrosion, solely through the necessity of meeting the demand in some quarters for cheaper controls, as they represent a major item in establishing the cost of oil burner installations.

It is, therefore, an object of this invention to provide a simple device which may retain the use of a mercury switch as a circuit breaker, if desired, and of such construction as to dispense with the need of costly power producing mechanisms, and further, to eliminate the shunt circuit, and instead, to provide means whereby the relationship between the releasable switch holding means and the electric thermal actuating means may be changed or one shielded from the other during normal running operation. By this method, the heating element may be constantly energized during the operation of the controlled device, or mechanisms, and, if for any reason during that period should the elements comprising the safety mechanism be caused to assume their normal starting positions, a much shorter period of operation is thus attained in effecting the release of the safety switch than possible with the shunt circuit wherein only a substantially constant tripping period is possible at any time upon, or during, a demand for operation of the controlled device, it being necessary to allow a sufficient tripping time to permit the burner to start normal operation when the furnace is cold as the oil may be slow in reaching the combustion chamber due to the necessity of the pump having to bring it from a remotely located tank.

By means of this invention, it is possible to reduce to a minimum, which probably will not be exceeded, the number of contacts heretofore found necessary in controls of this character to make and break a circuit to meet the greater number of applications. The simplicity of construction, which this feature affords, makes possible its use as a reliable control of great utility in fields where it is adaptable.

With these and other objects in view, reference is made to the accompanying drawings which illustrate preferred forms of this invention with the understanding that detail changes may be made without departing from the scope thereof.

In the drawings:

Figure 11 is a fragmentary view in side elevation of another embodiment of this invention.

Figure 12 is a view in front elevation of Figure 11 showing the switch tube in closed position and the heating element rendered inoperative.

Figure 13 is a detail view in front elevation of the means for rendering the heating element inoperative and the actuator for said means.

Figure 14 is a view in section taken on the line 14—14, Figure 13.

Figure 15 is a schematic wiring diagram of the circuit controlled by the device illustrated in Figure 11.

Figure 16 is a fragmentary view partly in side elevation and partly in section of a further embodiment of this invention.

Figure 17 is a view in front elevation of Figure 16 illustrating the parts in their normal starting position.

Figure 18 is a detail top plan view of the front carrying plate and the mechanism mounted thereon including the tripping means for the tube switch less the heating element.

Figure 19 is a view of the parts illustrated in Figure 17 showing the heating element in inoperative position.

Figure 20 is a view similar to Figure 19 showing the position of the parts after the tube switch has been tripped by the heating element.

Figure 21 is a detail view in front elevation of the actuator for the heating element.

Figure 22 is a schematic wiring diagram of the circuit controlled by the device illustrated in Figure 16.

Figure 1:
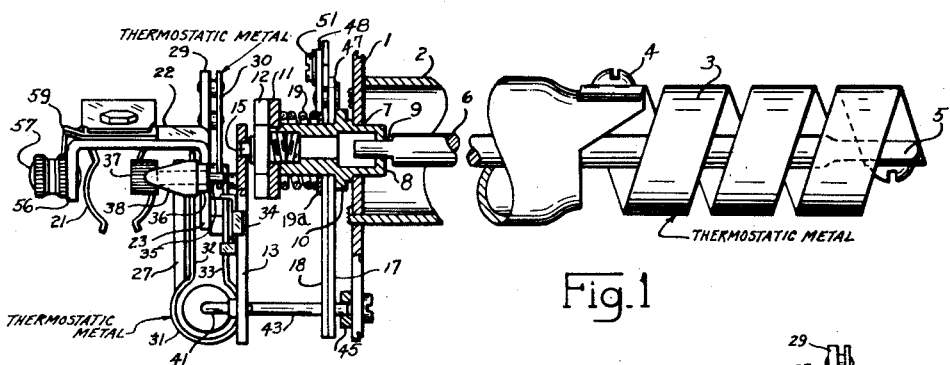
Figure 1 is a fragmentary view partly in side elevation and partly in section of one form of this invention, showing the switch closed and the heating element in operating position.

The embodiment of this invention, illustrated in Figures 1 to 6, is adapted to control the operation of a motor such as is employed to operate the mechanism of a fluid fuel burner, and is responsive to combustion conditions of the furnace to which the fluid fuel burner is applied. The switch mechanism is mounted upon the base plate 1 which may form the bottom of an enclosure, not shown. To the rear of the base plate 1 a tubular member 2 is secured which is adapted to enter and be attached to the stack leading from the furnace to the chimney in the usual manner. The free end of the tubular member 2 mounts one end of a spiral or helix of bi-metallic or thermal metal 3 which is secured thereto by the screw 4. The free end of the coil or helix is secured to the outer end 5 of an operating shaft 6 arranged axially of the tubular member 2. The base plate 1 is provided with a circular opening 7 within and concentric to tubular member 2. A hollow cylindrical member 8 is mounted to rotate freely within the aperture 7. The inner end of the shaft 6 is flattened and the outer end of the member 7 is correspondingly recessed at 9 to receive the flattened end of the shaft 6 allowing reciprocation of the flattened end to compensate for contraction and expansion of the shaft in response to combustion conditions and impart a rotative movement to the member 8 upon contraction or expansion of the coil or helix 3 in response to combustion conditions within the furnace. An annular flange or shoulder 10 is provided upon the member 8 adapted to engage the front side of the back plate 1 and the exterior end of the member 8 is shouldered to receive a circular plate 11 and the interior of this end is screw threaded to receive a threaded, flat headed bolt 12 which will secure the plate 11 upon the member 8. The switching mechanism is mounted upon a front plate 13 spaced apart from the base plate 1 by studs 14 which plate passes over the flat headed bolt 12. The head of the bolt 12 is provided with a central projection 15 which is received within an aperture 16 of the front plate 13. The aperture 16 in the front plate and the aperture 7 in the base plate act as bearings for the rotatable member 8. Two actuators in the form of perforated discs having depending actuator arms 17 and 18 are mounted upon the cylindrical body of the member 8 between the flange 10 and plate 11. A coil spring 19 is mounted about the cylindrical portion of the body 8 between the actuators and the plate 11 to press firmly the actuators into frictional engagement with each other. It is preferable to interpose a friction plate or washer 19a between the actuators and the coil spring 19. The tension of the spring 19 is adjusted by the bolt 12.

Figure 3:
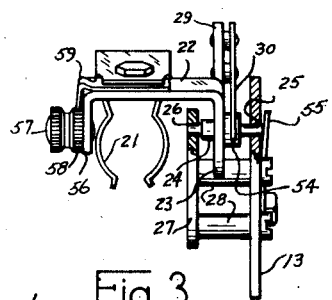
Figure 3 is a detail view in side elevation and partly in section of the switch tube carrier and manual releasing means.
Figure 2:
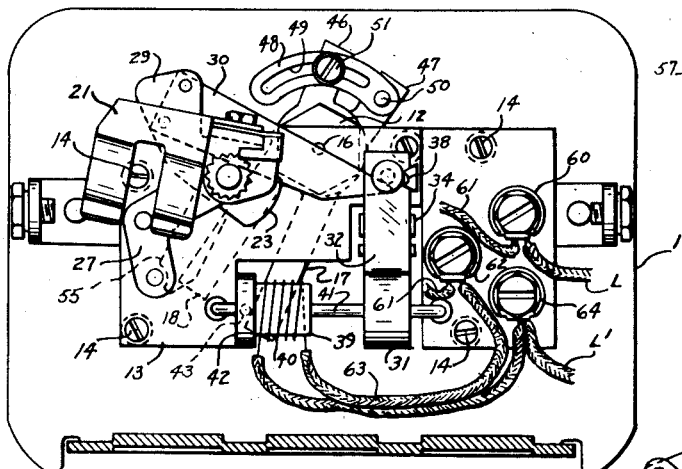
Figure 2 is a view in front elevation of Figure 1.

A mercury tube switch 20 is mounted in clips 21 secured to a portion 22 bent outwardly at right angles from the carrier plate 23. The carrier plate 23 mounts a pivot stud 24 passing therethrough, one end of which rotates in a bearing 25 provided in the front plate 13, as shown in Figure 3, and the other end rotates in a bearing 26 in the plate 27 spaced apart upon the exterior side of the front plate 13 by studs 28. The carrier plate on the side of its pivot most distant from the bearing 16 of the rotatable member 8 is extended upward and away from the bent portion 22 to form an extension 29 to mount a catch of the switch tripping mechanism in the form of a plate 30, preferably of thermal metal, extending therefrom to the other side of the bearing 16 of the rotatable member 8, as shown in Figure 2. The other member of the switch tripping mechanism includes a strip of bi-metallic or thermal metal bent back upon itself to form a circular portion 31 at the bend and is extended on each side thereof to form spaced apart parallel portions 32 and 33. The rearmost portion 33 is secured at its upper end by the adjustable clip 34 to the front plate 13. The upper end of the outer spaced apart parallel portion 32 extends above the clip 34 and mounts thereabove a catch pin 35 threaded through a boss 36 passing through and secured to said portion 32. The inner end of the catch pin 35 is advanced through the boss by the knurled knob 37 upon the exterior end of the catch pin 35 until it will pass over the extremity of the member 30 of the tripping mechanism when the carrier plate has been rotated to move the mercury tube switch 20 to close the circuit therethrough, as shown in Figure 2. The catch pin is held in adjusted position by the spring clip 38 engaging the knurls of the knobs 37.

The thermal member including the cylindrical portion 31 with the extending parallel spaced apart portions 32 and 33 when cold will maintain the switch in closed position when the member 30 is engaged by the catch pin 35.

A heating element in the form of a spool 39 wrapped with electrical resistance wire 40 of a diameter to be received within the circular portion 31 of the thermal member mounting the catch pin is mounted upon a guide 41 secured to the front plate 13 axially of the circular portion 31 of the thermal member carrying the catch pin so that the heating element may be received entirely within said circular portion 31 of the thermal member and withdrawn entirely therefrom.

Figure 4:
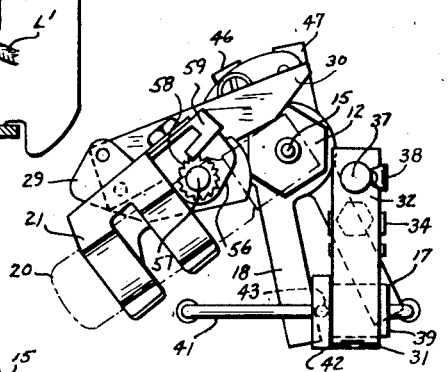
Figure 4 is a detail view in front elevation of the switch tube carrier in the tripped position and showing the heating element in operating position.

When the mercury tube switch is in the latched position, as shown in Figure 2, and the heating member is received entirely within the circular portion 31 of the thermal member, as shown in Figure 4, and an electric current is passed through the resistance wire 40, the heat therefrom will be transmitted to the thermal member and as the portion 33 thereof is fixed to the front plate 13, the spaced apart parallel member 32 will be caused to move outwardly and remove the catch pin 35 from the path of the member 30 of the tripping mechanism whereby said member will be released and the weight of the carrying member 22, extension 29 of the carrier plate 23 and the mercury tube switch 20 will cause the carrier plate to rotate and tilt the mercury tube switch to the open position, as shown in Figure 4.

The heating element is reciprocated upon its guide 41 into and out of reception within the circular portion 31 of the thermal member by the actuator arms 17 and 18 carried upon the rotatable member 8 which mounts one end of the operating shaft 6 of the coil or helix 3. The outer end of the spool 39 is provided with an enlarged head 42 which not only provides a means of limiting the travel of the spool in the direction of the thermal member, but also mounts upon the side adjacent plate 1 an operating shaft 43, the free end of which is adapted to travel in a slot 44 in a plate 45 secured to the base plate 1. The actuator arms 17 and 18 extend on opposite sides of the operating shaft 43 and are so adjusted upon the friction clutch formed by the spring 19 upon the member 8 that when the burner is idle and there is no combustion in the furnace, so that the helix is cold, the actuator arm 18 will be brought into engagement with the operating shaft 43 to advance the spool 39 until it is entirely received within the thermal member and maintain it in that position as long as there is no combustion. The other actuator arm 17 is so adjusted that when combustion takes place and the heat thereof affects the thermal coil 3 to cause the member 8 to rotate, the arm 17 will engage the operating shaft 43 to advance the spool 39 toward the end of its travel most distant from the thermal member and maintain it in that position as long as combustion continues.

The friction clutch formed by the spring 19 holding the actuator device in frictional engagement with each other and with the flange 10 upon the member 8 rotated by the expansion or contraction of the thermal coil 3 allows an over travel of the shaft 6 beyond that necessary to operate the heating element in both directions and upon a counter rotation to immediately rotate the actuator arms to cause the heating element to move in said counter direction. In devices of this character, the period of time between the closing of the circuit through the heating element within the thermal member when the burner mechanism is idle and the withdrawal of the heating element by the establishment of combustion is adjustable to suit various constructions. This invention contemplates the provision of adjusting arms 46 and 47 extending from the actuator discs on the sides opposite the actuator arms 17 and 18. One of the adjusting arms mounts a curved plate 48 having a curved slot 49 upon a pivot 50 and the other arm mounts a threaded clamp 51 passing through the slot 49 so that the distance between the operating shaft engaging portions of the actuator arms 17 and 18 may be adjusted to provide a fixed temperature change of equal amounts to move the heating element corresponding distances. Also, if desired, the adjusting arms may be omitted and adjustable stops in the form of posts 52 adjustably mounted within slots 53 upon the base plate 1 on opposite sides of the actuator arms 17 and 18 may be used to limit their travel and determine the amount of temperature change required to move the heating element and may be independently adjusted to provide a large change to withdraw the element and a smaller change in temperature before it is again received within the thermal member.

In order to manually trip the switch mechanism when required, the pivot stud 24 of the carrier plate 23 is shouldered so that the corresponding reduced portions are received within the bearings 25 and 26, with the reduced portion extending a greater distance from the shoulder 54 upon the side adjacent the frontplate 13 than on the other side of the carrier plate 23. The shouldered portion on the said outer side of the carrier plate 23 is normally held in engagement with the mounting plate 27 by a flat spring 55 mounted upon the rear of the front plate 13 with its free end bearing against the end of the pivot stud 24 when the catch pin 35 is engaged by the plate 30 of the switch tripping mechanism. A bodily movement of the carrier plate 23 in the direction of the front plate 13 is therefore permitted to move the plate 30 out of the path of the catch pin 35 to allow the switch tube 20 to be rotated to open position. To accomplish this, it is preferable to provide the outstanding clip carrying portion 22 of the carrier plate 23 with an angular depending termination 56 which mounts a rotatable knurled headed shaft 57 in line with the pivot stud 24, the knurled head of which may extend through the cover, not shown, of the switching mechanism so that a manual depression of the shaft 57 will release the member 30 from the catch pin 35 and the tube switch rotated to open position. The shaft 57 also provides means for a manual reset after the switch has been tripped by operation of the control mechanism. It is preferable to provide the rotatable shaft 57 with a toothed flange 58 upon the outer side of the member 56 and a spring clip 59 secured to the part 22 of the carrier plate 23 having a termination in engagement teeth of the flange 58 so that upon a manual release of the plate 30 is not first released, the imparting of a rotary movement to the knurled head of shaft 57 will allow of an override to prevent damaging the mechanism.

It is also preferable to form the member 30 of the tripping mechanism of thermal metal to compensate for ambient temperature to prevent variations in the adjusted tripping time and insure a constant connection with the catch pin 35 under normal conditions. With this arrangement the amount of current consumed by the heating element may be reduced to a very low wattage. In commercial use as low as one watt has been found sufficient in most cases.

Figure 6:
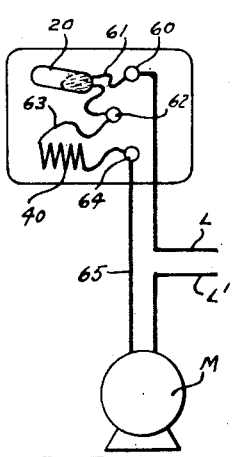
Figure 6 is a schematic wiring diagram of the circuit controlled by the device illustrated in Figure 1.
Figure 5:
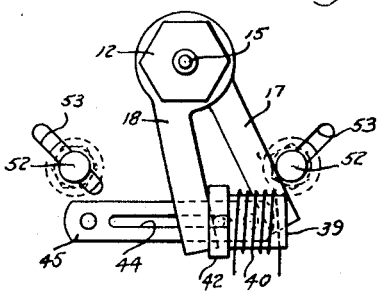
Figure 5 is a detail view in front elevation of the heating element and modified form of actuator therefor.

The mercury tube switch 20 is connected in series with the motor through the winding 40 of the heating element so that as long as the burner mechanism is in operation, the heating element will be operative, as shown in the schematic diagram in Figure 6. The lead L from the commercial line is attached to binding post 60, the current then passes by lead 61 through the mercury tube switch 20 to binding post 62 and from thence by lead 63 through the resistance winding 40 of the heating element to binding post 64 and by lead 65 therefrom to the motor M and by lead L' to the commercial line. The mercury tube switch 20 is not shown in Figures 1, 2 and 3 for to do so would obscure part of the mechanism, but it is indicated in broken lines in Figure 4.

As the heating element is always in circuit after institution of operation of the burner mechanism, upon a failure of combustion thereafter and the heated element is received with the thermal member, it will trip the switch in much less time than upon failure of initial ignition when the heating element is cold.

In the embodiment of this invention, just described, the heating element is received and withdrawn from a stationary thermal element. Figures 7 to 10, inclusive, illustrate a modification in which the heating element is stationary and the thermal element is moved to embrace and separate from the heating element. In this form, the heating element and thermal element are of the same construction as hereinbefore described and an open contact switch is employed in place of the mercury tube switch shown in the first form.

Figure 7:
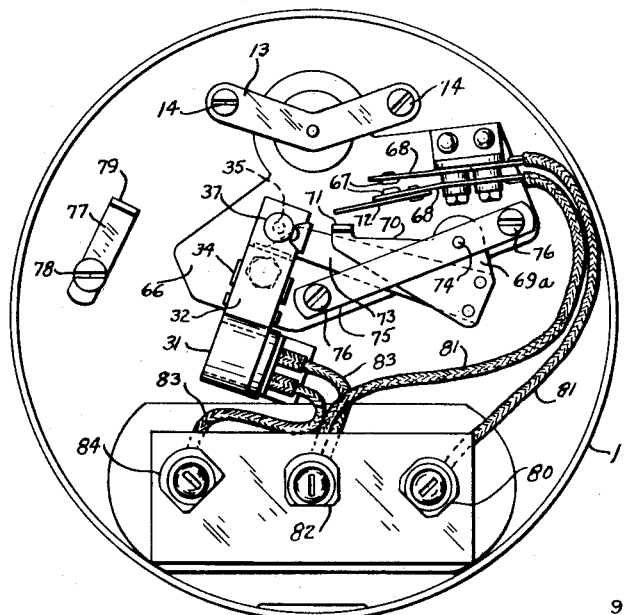
Figure 7 is a view in front elevation of another embodiment of this invention showing the heating element in operating position and the switch in tripped position.
Figure 9:
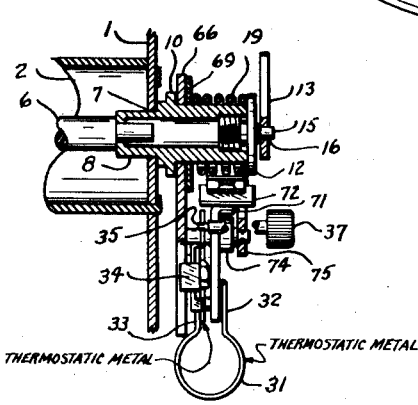
Figure 9 is a view in section taken on the line 9—9, Figure 8, looking in the direction of the arrows.
Figure 8:
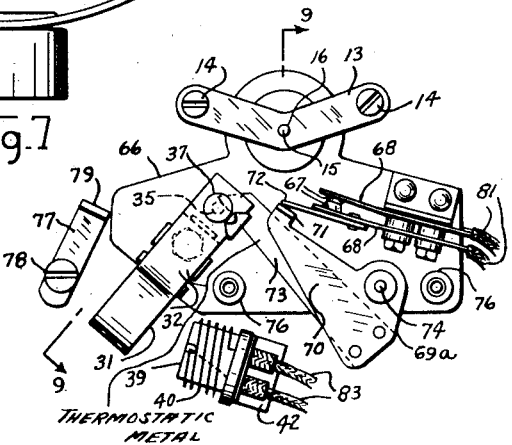
Figure 8 is a detail view in front elevation illustrating the switch closed and the heating element in inoperative position.

In the form shown in Figures 7, 8 and 9, the carrier plate 66, carrying an open contact switch including normally spaced apart contacts 67 upon resilient arms 68 of commercial construction is rotatably mounted upon the member 8 rotated in response to combustion conditions, as hereinbefore described, and as in the other form it is preferable to interpose a friction washer 69 between the plate 66 and spring 19 of the friction clutch mechanism to cause the plate 66 to engage frictionally the flange 10 of the member 8.

The carrier plate 66 also mounts the switch tripping mechanism including the thermal element or member in which the portion 32 carrying the catch pin 35 is spaced apart from the carrier plate 66 and the carrier plate mounts as well the switch tripping mechanism which includes a tripper plate 69a pivotally mounted upon the plate 66 below the open contact switch. The tripper plate 69a is provided with an arm 70 extending to the left of the extremity of the contact carrier 68 terminating in a flat portion 71. The spring contact carrying arm 68 is provided with an extension 72 adapted to be engaged by the flat portion 71 of the tripper arm 70 so that when the tripper plate is rotated in the direction of the arm 68, the tripper 70 will engage and flex the arm 68 to cause the contacts 67 to engage each other. The tripper plate 69a also mounts a member 73, preferably of thermal metal, corresponding to the member 30 in the first form, so positioned that when the plate 69a has been rotated sufficiently to cause the contacts 67 to be brought into engagement to close the circuit through the switch, the end of the member 73 will be engaged on the under side by the catch pin 35 of the thermostatic member and hold the contacts in engagement. The pivot 74 of the plate 69a rotates in a bearing in the carrier plate 66 and in a bearing therefor in a plate 75, spaced apart from the front of the carrier plate by the studs 76.

The heating element is rigidly mounted by attaching the flange 42 of the spool 39 upon the base plate 1 and so arranged that when the carrier plate swings the thermal member in that direction, the circular portion 31 thereof will completely embrace the winding 40 upon the spool 39 of the heating element. Figure 7 shows the heating element so embraced and the tripper plate 69a released to open the switch, while Figure 8 shows the switch closed and the carrier plate 66 rotated to separate the thermal member from the heating element. A temperature differential adjustment is provided by the adjustable plate 77 clamped at one end by the threaded bolt 78 upon the base plate 1, while the free end is provided with a bent back stop 79 adapted to be engaged by the edge of the carrier plate 66 to limit its rotation in that direction.

Figure 10:
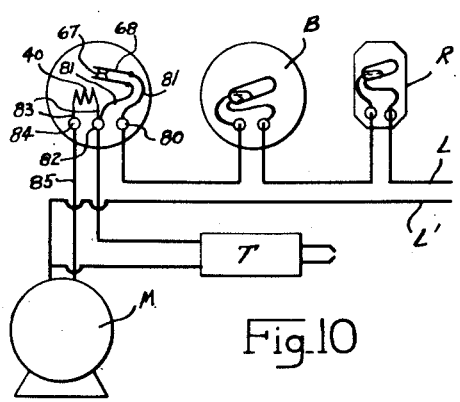
Figure 10 is a schematic wiring diagram of the circuit controlled by the device illustrated in Figure 7.

The schematic diagram of Figure 10 illustrates the lead L from the commercial line conducting the current through a commercial room thermostat R and the commercial boiler control B to binding post 80 and from thence through lead 81 to the arms and contacts 68 and 67 to binding post 82 and then by lead 83 through the resistance winding 40 of the heating element to binding post 84 and by way of lead 85 through the motor M to the return lead L' to the commercial line.

A third form of this invention is illustrated in Figures 11, 12, 13 and 14. In this form both the heating element and thermal member remain fixed or stationary and the expansion and contraction of the thermal coil or helix 3 in response to combustion conditions inserts and retracts a shield of heat insulating material between the two. The means for operating such a heat shielding plate may be similar to that for rotating the carrier plate 66 of Figure 7, or may be of the type shown in Figure 11 in which the operating shaft 6 of the thermal coil or helix 3, responsive to combustion conditions, mounts a toothed wheel 86 upon the front of the base plate 1.

Two complementary plates 87 and 88 are mounted upon a pivot stud 89 secured to the base plate 1, each having wing like extensions 90 and 91 on each side thereof and arms 92 and 93 depending from the bottom thereof.

An actuator in the form of an arm 94 is carried on a sleeve 95 pivotally mounted on the pivot stud 89 having a pointed end 96 adapted to be received between adjacent teeth of the wheel 86 when the arm is vertical and having a counterweight at the other extremity adapted to urge the arm to assume the vertical position. In this construction, rotation of the wheel 86 imparts a movement of the end 96 in the same direction by the contacting tooth of the wheel and thereafter upon further movement the succeeding teeth wipe over the said end 96, but upon a counter rotation, the adjacent tooth will engage the opposite side of the end 96 and rotate it in a counter direction and thereafter the succeeding teeth will wipe over the said end. The operating arm 94 is provided with an operating stud 97 adapted to extend between and beyond the depending arms 92 and 93 of the shielding plates 87 and 88.

A front plate 98 is mounted in spaced apart relation upon the base 1 in front of the pivot stud 89 by studs 99. One end of the front plate 98 mounts a heating element in the form of a vertical shaft 100 of insulating material between brackets 101 carried thereby, which shaft is wrapped with a coil of resistance wire 102. A thermal member in the form of a strip of bi-metal or thermal metal 103 is clamped at its lower end in a cut out portion of the front plate in spaced apart parallel relation to the heating element by a clamp 104. The upper free end of the strip 103 mounts a catch pin 35, of similar construction to that shown in Figure 1, in a bracket 104a extending from the front side thereof. The front plate 98 also mounts on the outer side of the other end a switch carrier plate 23 and switch carrier and tripping member 30 of the same construction, as shown in Figures 1, 2, 3 and 4, and hereinbefore described. Heat from the resistance wire 102 when placed in circuit will trip the switch in the same manner as described in connection with said figure.

The plate 88 is of heat insulating material, or may be of metal which will dissipate enough heat as will keep the temperature of the thermal release below its tripping point, and is so shaped and mounted as to pass the wing portion 90 thereof between the heating element and thermal member, when rotated in one direction, to shield the latter from the heat eminating from the energized resistance coil 102, as shown in full line in Figure 13, and when rotated in the opposite direction to completely uncover the coil 102, as shown in broken lines in Figure 13. The complementary plate 87 not only acts as a counterweight for the plate 88, but provides the depending actuator arm 93 to cooperate with the actuator arm 92 of the plate 88. To provide a mounting for the actuator arms 92 and 93 which embrace the actuator stud 97 of the actuator 94, the pivot stud 89 is shouldered and a sleeve having a central annular flange 105 is mounted upon the outer end of the stud 89 with the plates 87 and 88 mounted on opposite sides of the flange 105 and adapted to rotate thereabout with washers 106 mounted on each end of the sleeve to hold said plates thereon. A nut 107 threaded on the end of the stud 89 secures the sleeve to the stud.

Complementary stops in the form of studs 108 are provided upon the base 1 and are adapted to be engaged by the bottom of the wing portions 90 and 91 of the plates 87 and 88 when they have been rotated to shielding and uncovering position.

The schematic wiring diagram in Figure 15 shows this form of control connected in the secondary circuit of a repulsion relay and in circuit with a room thermostat R. In this type of control, when the thermostat R closes, the current passes from the coil 109 of the relay through the lead 110, through the thermostat R to binding post 111 and through lead 112 and resistance heat coil 102 to binding post 113 and by lead 114 through switch 20 to binding post 115 and then by lead 116 to the coil 109. The motor switch 117 is connected in the commercial line and through the motor M when the room thermostat R closes the secondary circuit. The primary coil 118 of the relay illustrated is constantly energized from the commercial line.

The form illustrated in Figures 16 to 22 shows an application of this invention that is tripping the safety switch by means of changing the relation of a heating element and the thermostatic member, to the electrical control disclosed in this applicant's co-pending application, Serial No. 661,759, filed March 30, 1933, and in doing so combines the motor and safety switches in one three-terminal mercury tube switch.

The bi-metallic, or thermal coil 3 responsive to combustive conditions causes the oscillation of the switch carrying plate 119 in the same manner as disclosed in said prior co-pending application which is also described in this applicant's prior Patent No. 1,762,183, granted June 10, 1930. The secondary coil 120 of the repulsion relay is carried by means mounted upon a pivot stud 121 in the same manner as disclosed in said prior application and inasmuch as the mechanism cooperating between the operating means for the carrier plate 119 and the secondary coil 120 is the same as that shown in said prior application, it is not thought necessary to further describe these parts herein.

The arm 122 extending from one side of the coil 120 and which is pivoted on the pivot stud 121 is provided with a depending angular termination 123 to which is pivoted on a switch carrier plate 124 which mounts in the clips 125 a three-terminal mercury tube switch 126, shown in detail in Figure 20. This switch is held in its normal operating positions substantially parallel to the arm 122 of the carrying means for the coil 120 by providing an extension 127 to the carrier plate 124 with an angular, upwardly extending member 128 which mounts at its free end a catch pin 129 normally adapted to engage under the nose 130 of a latch member 131 mounted to rotate about a pivoted post 132 in conjunction with a tripping plate 133 mounted thereon. The post 132 is mounted between plates 136 and 136a held in parallel spaced apart position by posts 134 and 138 and secured to the front plate 137 by screws 138a. The tripping plate 133 is provided with a slot 135 through which the post 134 passes to limit the movement of said tripping plate about its pivoted point. The tripping plate 133 is provided with a bi-metallic or thermal member 30 similar to and for the same purpose as the member 30 forming a part of the tripping mechanism illustrated and described in connection with Figures 1 to 15, inclusive. A thermal member similar to the thermal member illustrated in the above said figures including a circular portion 31 and spaced apart parallel portions 32 and 33 extending therefrom is mounted in the position shown in Figures 17 and 20 with its shorter end 33 clamped upon the plate 136. The free end of the portion 32 mounts a catch pin 35 adapted to be engaged when cold by the member 30 when the switch 126 is in the normal open or closed position and with the nose of the latch 131 in engagement with the catch pin 129. A guide rod 139 is mounted concentric with the axis of the curved portion 31 of the thermal member upon a bracket, as shown in Figure 17, secured to the rear side of the front plate 137. A heating element including a spool 39 wrapped with electrical resistance wire 40 and similar to the heating element disclosed in said Figures 1 to 15, inclusive, is mounted to reciprocate upon said guide rod 139 to be received entirely within the circular member 31 of the thermal member and to be withdrawn entirely therefrom. The carrier plate 119 is provided with an extension 140 of the bracket 141 secured thereto which is adapted to pass under the flange 42 of the spool 39 so that when the carrier plate 119 is in the position shown in Figure 17, the heating element is received entirely within the circular portion 31 of the thermal member, and in rotating from this position to the position shown in Figure 19, the extension 140 engaging the flange 42 of the heating member moves the heating member over the guide rod 139 to withdraw it entirely from the thermal member to the position shown in Figure 19.

When the parts are in the position shown in Figure 17, as is assumed when the burner mechanism is idle, the passage of an electric current through a resistance coil 40 of the heating member, which in this position is entirely received within the thermal member, will cause the free end of the portion 32 thereof to move outwardly and release the catch pin 35 from engagement with the member 30, whereupon the tripping plate 133 is released and the free end thereof will rotate downwardly until the end of the slot 135 engages the stud 134 and in so doing will cause the latch 131 to be released from engagement with the catch pin 129 whereupon the safety switch 126 is rotated about the pivot of the carrier plate 124 to assume a position shown in Figure 20 in which the circuit is open through all of its terminals. The latch 131 is caused to rotate about its pivot post 132 in conjunction with the tripping plate 133 by forming the end of the tripping plate 133 on the side of its pivot post most distant from the stud 134 with an angularly extending termination 142 and providing the latch 131 with an extension from its upper end jointed thereto whereby when the tripping plate 133 has been rotated so that its member 30 will be engaged by the catch pin 35, the nose 130 will be adapted to engage the catch pin 129 and support it in the axis of the pivot stud 121.

The mercury tube switch 126 is provided with terminals 143 and 144 entering from opposite ends both of which will be submerged in the mercury 145 when the switch is held in the open position by the latch 131 and the movable coil 120 of the relay is in its lowermost position, as shown in Figure 17, the position assumed when the circuit of the coil 120 is opened, as hereinafter described. When this coil is energized and is repelled from the stationary coil 146 of the relay, as hereinafter described, the switch will be tilted about the pivot 121 without disturbing the connection between terminals 143 and 144, as shown in Figure 22. An additional terminal 147 enters the same end of the switch tube as the terminal 144 and is separated therefrom so that when the switch 126 is in the position described when the secondary coil 120 is de-energized, the mercury 145 in the switch 126 will be out of contact with said terminal 147, but when the coil 120 has been repelled to tilt the mercury tube switch to the position shown in Figure 22, the circuit will be completed between the terminals 144 and 147 by the flow of the mercury 145 to that end of the switch to submerge terminal 147.

From the schematic wiring diagram shown in Figure 22, it will be seen that the lead L from the commercial line passes through binding post 148 and through terminals 144 and 143 when the switch is tilted to the position shown in Figure 17 with the coil 120 resting upon the coil 146 and from terminal 143 to binding post 149 and from thence through the windings of the primary coil 146 of the relay to the binding post 150 and from thence to lead L' back to the commercial line. The windings of the secondary coil 120 are placed in circuit by lead 151 through binding post 152 and lead 153 through the room thermostat R to binding post 154 and from thence by lead 155 through the resistance winding 40 of the heating element to binding post 156 and from there through lead 157 to the other end of the winding coil 120. When the room thermostat is open, the secondary circuit will be broken and the coil 120 will rest upon the coil 146. When the room thermostat closes the secondary circuit through coil 120, the coil will be repelled, as shown in Figures 19 and 22, thereby closing the circuit between terminal 144 and 147 so that the commercial current will then pass through binding post 158, motor M, binding post 159 and back through lead L' to the commercial line. When the room thermostat is first closed, the heating element is received entirely within the thermal member, as shown in Figure 17, and when the room thermostat closes the secondary circuit, the heat produced by the resistance coil 40 of the heating element will cause the latch pin 35 to disengage the member 30 whereupon the latch 131 will release the switch tube 126 to rotate to the open position, as shown in Figure 20, unless combustion occurs within a predetermined time which is sufficient to cause the thermal coil 3 responsive to combustive conditions to rotate the carrier plate 119 to remove entirely the heating element 39 from the thermal member 32, as shown in Figure 19. Should at any time after combustion has been initiated and the secondary circuit closed through the room thermostat R, the combustion fail or cease from any cause whatsoever, the thermal member 3 responsive to combustive conditions will cool and cause the carrier plate 119 to rotate in the opposite direction and move the heating element to be received entirely within the thermal element, whereupon the free end of the portion 32 of the thermal member will move outwardly and release the tripping mechanism to allow the switch 126 to open all circuits therethrough causing a shut-down of the burner mechanism until the switch 126 is reset.

While the several forms of devices embodying this invention have been shown, it has not been attempted to show all the variations of known and usable forms of construction which may be applied to this idea without departing from the scope of this invention. Various methods or means known to the art for varying the relationship of the heating element and the tripping device may be successfully applied and various types of thermal releasing units known to the art may be successfully used, such as metal, expansive liquid, vapor tension, melting of solder or other means, which satisfactorily respond to the change in the relationship between the heater and the thermal release or tripping device, without departing from the scope and intent of this invention.

Likewise, while the drawings show the heating element connected in series with a motor load, or relay load, which is preferable as the opening of the switch breaks the motor circuit, the heating element may be connected in parallel with the motor or relay circuit with the motor or relay load connected in series with the switch and still be within the scope of this invention.

Although the disclosure of this invention has been confined to the description of its application with devices used in connection with the control of fluid fuel burners, the extent of its use is by no means limited to that field alone.

The disclosure of means whereby a normally closed releasable switch may be held closed or released under certain conditions need not depend solely upon the temperature responsive helical coil operated mechanisms, as shown, for actuating the heating element. Other means for moving the heating element or shielding it are suggested in the patents referred to in the introduction.

Where the safe operation of equipment requires that certain volumes of liquid be maintained during the operating periods float operating mechanisms may be employed, operating upon changes in liquid level, to actuate the heating element whereby failure to maintain the necessary volumes would render the equipment inoperative. The invention may further be employed in the construction of overload devices wherein solenoids or magnets, upon the passage of certain amounts of current therethrough, may be caused to operate means to move the heating element to release the switch. Furthermore, the need for breaking an electric circuit may be dispensed with where the holding means, when released may be used to mechanically operate another device.

It is therefore evident, that due to the various ways in which this invention may be used, that changes in the disclosures illustrated herein may be made without departing from the scope of this invention.

What I claim is:

1. A thermally actuated mechanism, a heating device, a thermally actuated operating device responsive thereto for operating said mechanism, a temperature responsive device independent of the heating element for bringing the zone of heat from the heating element into and out of operative relation to the operating device.

2. The structure of claim 1 wherein the said temperature responsive device acts to bodily move one of the first two devices.

3. A thermally actuated mechanism, a heating element, a thermally actuated operating device responsive thereto for operating said mechanism, movable means to increase and decrease the transfer of heat from the heating element to the operating device while the heating element is energized, and a temperature responsive device independent of the heating element to actuate said movable means.

4. A circuit control including a normally closed trip switch, an electric heating element in circuit with the switch circuit, a thermally actuated tripping device responsive thereto to open the switch, a temperature responsive device, and means actuated thereby adapted to be interposed between the tripping device and heat element to render the latter inoperative.

5. A circuit control including a normally closed switch, a thermally actuated operating device mechanically connected thereto, a heating element therefor and means responsive to temperature changes independent of said heating element to change the relative proximity of the heating element and operating device.

6. A circuit control including a normally closed switch, a heating element in circuit with the switch circuit, a thermally actuated element responsive thereto to open the switch, a temperature responsive device independent of the heating element for bringing the zone of heat from the heating element into and out of operative relation to the thermally actuated means.

7. The structure of claim 6 wherein said temperature responsive device acts to bodily move one of said elements.

8. The structure of claim 6 wherein said temperature responsive device acts to bodily move one of said elements a limited distance, and wherein said temperature responsive device is provided with means allowing said device to continue its movement after said element has reached the limit of its bodily movement.

9. A circuit control including a normally closed trip switch, a thermally actuated tripping device for releasing the switch, a heating element for actuating the tripping device, movable means to increase and decrease the transfer of heat from the heating element to the tripping device while the heating element is energized, independent temperature responsive means to actuate said movable means, means to limit the travel of the movable means, and overriding means to allow the actuating means to continue to move after the change in heat transfer has been effected.

10. A circuit control including a normally closed trip switch, a thermally actuated tripping device for releasing the switch, a heating element for actuating the tripping device, movable means to increase and decrease the transfer of heat from the heating device to the tripping device, independent temperature responsive means to impart a limited movement to said movable means, and a yielding continuously acting slip connection between the two said means to allow the temperature responsive means to move after the change in heat transfer has been effected and upon reversal of movement thereof to immediately reverse the operation of the said movable means.

11. A circuit control including a normally closed trip switch, a thermally actuated tripping device for releasing the switch, a heating device in circuit with the switch circuit adapted to actuate the tripping device, a temperature actuated means adapted to move and change the relative proximity of the heating device and tripping device, and adjustable means to limit the said movement thereof, said temperature actuated means including an overriding means to allow the temperature actuated means to further move in the same direction after one of said devices has been moved into engagement with an adjusted limit stop.

12. A circuit control including a normally closed trip switch, a thermally actuated tripping device for releasing the switch, a heating device adapted to actuate the tripping device in circuit with the switch circuit, a temperature actuated means adapted to move and change the distance between the said devices, adjustable means to limit the said movement, said means including a yielding continuously acting slip connection adapted to allow the actuating means to continue movement in the same direction after one of said devices has been moved against its limit stop, and immediately upon reverse movement of said means to impart a reverse movement to said device.

13. A circuit control including a normally closed trip switch, a thermally actuated tripping device to release the switch, a heating element in circuit with the switch in operative relation to the tripping device, a temperature responsive device, and means actuated thereby to interpose a shielding member therebetween to render the heating element inoperative.

14. In a circuit control, a temperature responsive device including an operating shaft adapted to be rotated in opposite directions upon variations of temperature with spaced apart actuator arms mounted thereon for movement therewith, in combination with a normally closed trip switch, a heating element in circuit with said switch, a thermally actuated tripping device responsive thereto adapted to release the switch, and means operated by the actuator arms to bodily move the heating element into and out of operative relation with the tripping device.

15. The structure of claim 14 including a stationary guide over which the heating element is mounted to travel.

16. In a circuit control, a temperature responsive device including an operating shaft adapted to be rotated in opposite directions upon variations of temperature with an actuator mounted thereon for movement therewith, in combination with a normally closed trip switch, a heating element in circuit with said switch, a thermally actuated tripping device responsive thereto adapted to release the switch, and means operated by the actuator to bodily move the heating element into and out of operative relation with the tripping device, including a stationary guide over which the heating element is mounted to travel, and an operating shaft mounted upon the heating element to be engaged alternately by the actuator upon movement in alternate directions to bodily move the heating element.

17. The structure of claim 16 wherein the mounting means of the actuator includes a friction clutch between the rotatable operating shaft and actuator, and adjustable means to limit the travel of the said actuator before the clutch operates to allow further rotation of the operating shaft thereafter.

18. In a circuit control, a temperature responsive device including an operating shaft adapted to be rotated in opposite directions upon variations of temperature with a carrier plate mounted thereon for movement therewith in combination with a normally closed trip switch mounted upon the carrier plate, a thermally actuated tripping device mounted upon the carrier plate adapted to release the switch, a heating element in circuit with the switch independent of the carrier plate so mounted that the movement of the carrier plate bodily moves the tripping device into and out of operative relation with the heating element.

19. The structure of claim 18 wherein the mounting means of the carrier plate includes a friction clutch between the rotatable operating shaft and carrier plate and adjustable means is provided to limit the bodily movement of the carrier plate away from the heating element.

20. The structure of claim 18 wherein the mounting means of the carrier plate includes a friction clutch between the rotatable operating shaft and carrier plate and adjustable means is provided to limit the bodily movement of the carrier plate away from the heating element, and wherein the movement of the carrier plate is limited in the direction of the heating element upon assuming operative relation thereto before the clutch operates to allow further movement of the operating shaft therebeyond.

21. In a circuit control, a normally closed trip switch, a heating element in circuit therewith and a thermally actuated tripping device responsive thereto adapted to release the switch in permanent spaced apart operative relation thereto, in combination with a temperature responsive device including an operating shaft adapted to be rotated in opposite directions upon variations of temperature having a toothed operating wheel fixed thereon, a pivoted actuator arm having one end adapted to be engaged between adjacent teeth of said wheel and rotated therewith in both directions for limited distance and then upon continued rotation in the same direction to be retained at the limit of its rotation by the teeth of the wheel wiping thereover and having an operating stud on the free end, and a rotatable shield having depending spaced apart arms adapted to be engaged alternately by said stud upon movement in alternate directions and a portion thereof adapted upon rotation to be inserted and removed from between the heating element and tripping device responsive thereto.

22. A circuit control for an electrically operated device including a trip switch, a heating device, a thermally actuated tripping device responsive to the heating device to operate to trip said switch within a predetermined time after initial establishment of the circuit, and means actuated by normal operation of said electrically operated device to control the relative proximity of the heating device and tripping device within said predetermined time.

23. A circuit control for an electrically operated device including a trip switch, a heating device, a thermally actuated tripping device responsive to the heating device to operate to trip said switch within a predetermined time after initial establishment of the circuit, and means responsive to normal operation of said electrically operated device within said predetermined time to remove said heating device to render the tripping device inoperative during continued normal operation of the electrically operated device.

24. A circuit control for an electrically operated device including a trip switch, a heating device, a thermally actuated tripping device responsive to the heating device to operate to trip said switch within a predetermined time after initial establishment of the circuit, and means actuated by normal operation of said electrically operated device to remove the heating device from proximity of the tripping device within said predetermined time.

25. A safety switch for an electrically operated device including a thermally actuated trip switch, a heater for actuating the trip switch, and means responsive to normal operation of the electrically operated device for removing the heater from operative relation to said trip switch and maintaining it inoperative while the electrically operated device operates normally.

26. A safety switch for the control of an electrically operated device including a thermally actuated trip switch, a heater for actuating the trip switch, and means responsive to conditions produced by normal operation of the electrically operated device to decrease the transfer of heat from the heater to the thermally actuated trip switch.

27. A thermally actuated switch for an electrically operated fluid fuel burning mechanism including a heating element, a thermally actuated operating device responsive thereto for operating said switch to open the burner mechanism circuit, movable means to increase and decrease the transfer of heat from the heating element to the operating device while the heating element is energized, and means responsive to the presence and absence of combustion independent of the heating element to actuate said movable means.

28. A thermally actuated switch for an electrically operated fluid fuel burning mechanism including a heating element, a thermally actuated operating device responsive thereto for operating said switch to open the burner mechanism circuit, movable means to increase and decrease the transfer of heat from the heating element to the operating device while the heating element is energized, and a temperature actuated device responsive to the presence and absence of combustion independent of the heating element to actuate said movable means.

29. A circuit control for an electrically operated device including a trip switch, a heating device, a thermally actuated tripping device responsive to the heating device to operate to trip said switch within a predetermined time after initial establishment of the circuit, and means responsive to the operation and cessation of operation of said electrically operated device to control the operative relationship of said heating device and said thermal tripping device in accordance with normal and abnormal conditions of said electrically operated device.

30. In a circuit control, a temperature responsive device, including an operating shaft adapted to be actuated in opposite directions by means responsive to variations of temperature with spaced apart actuator arms mounted thereon for movement therewith, in combination with a normally closed trip switch, a heating element in circuit with said switch, a thermally actuated tripping device responsive thereto adapted to release the switch, and means operated by the actuator arms to bodily move the heating element into and out of operative relation with the tripping device.

31. In a circuit control, a temperature responsive device including an operating shaft adapted to be actuated in opposite directions upon variations of temperature with spaced apart actuator arms mounted thereon for movement therewith, in combination with a normally closed trip switch, a heating element in circuit with said switch, a thermally actuated tripping device responsive thereto adapted to release the switch, and means operated by the actuator arms to bodily move the heating element into and out of operative relation with the tripping device.

32. A safety control for a remote-controlled electrically actuated switching device for electric machines comprising a trip switch in series with the remote control, a heating device, a thermally actuated tripping device responsive to the heating device to operate to trip said trip switch within a predetermined time after the closing of the remote control and means actuated by normal operation of said electrical machine to control the relative proximity of the heating device and tripping device within said predetermined time.

IRA E. McCABE.